United States Patent [19]

Bouteiller et al.

[11] Patent Number: 5,430,563
[45] Date of Patent: Jul. 4, 1995

[54] METHOD FOR OBTAINING COMPOSITE MATERIALS BASED ON POLYMERS AND LIQUID CRYSTALS WITH DICHROIC DYES

[75] Inventors: Laurent Bouteiller, Palaiseau; Pierre Le Barny, Orsay; Jean-Pierre Vairon, Bourg La Reine, all of France

[73] Assignee: Thomson-CSF, Paris, France

[21] Appl. No.: 200,274

[22] Filed: Feb. 23, 1994

[30] Foreign Application Priority Data

Feb. 23, 1993 [FR] France .................. 93 02057

[51] Int. Cl.⁶ ............................................. G02F 1/13
[52] U.S. Cl. .................................. 359/51; 359/52
[58] Field of Search ................. 359/51, 52, 62, 103

[56] References Cited

U.S. PATENT DOCUMENTS

| | | | |
|---|---|---|---|
| 4,354,741 | 10/1982 | Mano et al. | 350/357 |
| 5,088,807 | 2/1992 | Water et al. | 359/51 |
| 5,268,783 | 12/1993 | Yoshinaga et al. | 359/52 |
| 5,372,745 | 12/1994 | Yoshinaga et al. | 359/51 |

FOREIGN PATENT DOCUMENTS

| | | | |
|---|---|---|---|
| 0343903 | 11/1989 | European Pat. Off. | 359/62 |
| 0512397 | 11/1992 | European Pat. Off. | |
| 2258318 | 2/1993 | United Kingdom | |

*Primary Examiner*—Anita Pellman Gross
*Assistant Examiner*—James A. Dudek
*Attorney, Agent, or Firm*—Oblon, Spivak, McClelland, Maier, & Neustadt

[57] ABSTRACT

Disclosed is an original method for preparing composite materials for a display screen, these materials containing a polymer, liquid crystal and dye. The present problem is one of inserting molecules of dye into composites of this type. The disclosed method proposes the preparation, in a first step, of a porous film of reticulate polymer. Then, molecules of liquid crystal (XL) and molecules of dye (C) are made to diffuse therein by a polymer-expanding solvent. After evaporation of the solvent, a film of polymer is obtained with inclusions containing liquid crystal (XL) and dye (C) with a wide range of concentrations in liquid crystal, thus making it possible to optimize the performance characteristics in terms of contrast and control voltage of the screen thus made.

15 Claims, 1 Drawing Sheet

TRANSMISSION=f (PEAK VOLTAGE)
Tmin=0.025% Tmax=36.2% V90=47V

METHOD FOR OBTAINING COMPOSITE MATERIALS BASED ON POLYMERS AND LIQUID CRYSTALS WITH DICHROIC DYES

BACKGROUND OF THE INVENTION

1. Field of the Invention

The field of the invention relates to display screens working notably in reflection mode. More specifically, the invention relates to composite materials based on polymers and liquid crystals containing dichroic dyes.

The working of this type of screen is based on the following electrooptical effect: a film made of composite material based on dyed liquid crystal and polymer is contained between two transparent conductive electrodes. The dyed liquid crystal is obtained by dilution of molecules of liquid crystal. At rest, without voltage, the film is light-scattering owing to the differences in refraction index between polymer and liquid crystal, and is furthermore absorbent owing to the molecules of dye whose orientation, which is dictated by that of the liquid crystal, varies randomly from one domain to the other. The application of a voltage to the two faces of this film causes the molecules of liquid crystal to get oriented with the molecules of chosen dichroic dye parallel to the applied electrical field. By working, on the one hand, with a liquid crystal whose ordinary index is equal to that of polymer (there is no scattering at the polymer/liquid crystal interface) and, on the other hand, with a dichroic dye that is no longer absorbent, a transparent film is obtained under an electrical field. A film such as this is therefore capable of having two states, a scattering and absorbent state and a transparent, non-absorbent state. The contrast obtained with composite materials such as these is far more satisfactory than that proposed with composite materials containing no dichroic dyes and having only a scattering state and a transparent state.

Furthermore, the use of composite materials based on dyed liquid crystal and polymer offers many advantages as compared with the other display techniques using notably liquid crystals. Indeed, these composite materials:

have the advantage by which polymers are easy to implement, which means that they can be easily deposited in thin layers, with controlled thicknesses, on large areas;

require no surface processing of the substrates forming the screen;

work without any polarizer (which implies a substantial gain in luminosity);

show an electrooptical effect that has an angle of view of the order of 150°.

2. Description of the Prior Art

Nevertheless, at present, the techniques used to implement these composite materials are not satisfactory, notably because of the presence of dichroic dyes.

* It is possible to use a method of emulsion of the dyed liquid crystal in an aqueous phase containing the hydrosoluble polymer or latex. However, the composite materials thus obtained require excessively high control voltages for an acceptable contrast. This is partly due to the differences in resistivity between the liquid crystal and the hydrosoluble polymer to which a substantial portion of the control voltage is directed, to the detriment of the liquid crystal that has to be oriented (Wiley R., WO 90/03593, 05.04.1990), (Drzaic P. S. Displays, 12.2.1991), (Drzaic P. S., Gonzales A. M., Jones P. Montoya W., SID 92 Digest, 571).

* At the same time, the methods of phase separation induced by thermal polymerization on a mixture of monomer, liquid crystal and dye show poor performance characteristics. These methods can only entail polycondensation and not radical polymerization owing to the deterioration of the dyes by the free radicals. However, in polymers obtained by polycondensation, a part of the dye is trapped in the amorphous chains of the polymer and not solely in the porous parts of the polymer. This is due to a degree of segregation between the polymer and liquid crystal that is generally insufficient because liquid crystal is a good solvent of the dye. The polymers typically used are epoxy-based polymers (West J. L., Ondris R., Erdmann M., SPIE LCD And Applications 76, 1990) and lead to very low contrasts.

* The methods of phase separation induced by photochemical polymerization (Ogawa T., Hotta S., EP 0434366 A2, Jun. 26 1991) are unsuitable owing to the low stability, under UV radiation, of certain molecules that form part of the composition of, the black dichroic dyes that deteriorate. Furthermore, the photopolymerization is obtained in a very incomplete way owing to the absorption of the photons by the dyes.

SUMMARY OF THE INVENTION

In order to overcome these different drawbacks, the present invention proposes the preparing, first of all, of a porous film of reticulate polymer and then the introduction into the pores, of a mixture containing liquid crystal and dichroic dye. Through this procedure, there is no risk of deterioration of the dichroic dye during polymerization. More specifically, an object of the invention is a method to obtain composite material for a screen, comprising a polymer (P), molecules of liquid crystal (XL) and molecules of dichroic dye (C) wherein said method comprises the following steps:

the making of a porous film (F) of reticulate polymer on a substrate (S);

the diffusion, in the porous film (F), of a mixture (M) containing a solvent capable of expanding the polymer, molecules of liquid crystal (XL) and molecules of dichroic dye;

the evaporation of the solvent leading to the obtaining of a polymer film with inclusions comprising a mixture of liquid crystal and dichroic dye.

The porous film of reticulate polymer may advantageously be obtained from a mixture $(M)_o$ of photopolymerizable monomer, photoinitiator and liquid crystal (XL). The monomer is preferably polyfunctional so as to form a network during the polymerization.

The mixture $(M)_o$ may be introduced by capillarity into a dismountable cell having a substrate (S) and a second substrate $(S)_o$ with low surface energy separated from the substrate (S) by shims.

The photopolymerization of the mixture $(M)_o$ may be achieved by ultraviolet irradiation through the substrate $(S)_o$.

The substrate $(S)_o$ may then be advantageously removed to wash the film of reticulate polymer comprising inclusions of liquid crystal $(X)_o$. This step is carried out by means of a solvent capable of expanding the polymer, thereby enabling the exclusion of the liquid crystal $(XL)_o$ leaving a porous film of reticulate polymer.

The porous film of reticulate polymer may also be obtained from a mixture $(M)'_o$ containing a monomer and a monomer-solvent liquid that is not a solvent of polymer and has low surface tension at ambient temperature. The polymerization may be initiated according to standard methods of polymerization.

The procedure continues then with the diffusion of a mixture (M) containing liquid crystal (XL), dye (C) within the polymer network and a solvent that is capable also of expanding the polymer. This solvent may be identical to the one used in the preceding washing step. After the evaporation of this solvent, the desired polymer film, containing inclusions of liquid crystal (XL) and dye, is obtained.

Through the method of the invention, and through the solvent used, it is possible to obtain beads of dyed polymer dispersed liquid crystal (PDLC) corresponding to high levels of polymer in relation to the liquid crystal as well as to polymer network liquid crystal (PNLC) with a lower polymer content and a higher density of liquid crystal. Each of these two types of composite materials has drawbacks and advantages which it is generally sought to control.

Indeed, PDLCs have the useful feature of displaying high mechanical strength which makes it unnecessary to use seals but nevertheless entails relatively high control voltages. This is why it is very advantageous to have a method of implementation that is applicable in a wide range of concentrations of liquid crystal to optimize the composite film based on polymer and liquid crystal.

BRIEF DESCRIPTION OF THE DRAWINGS

The invention will be understood more clearly and other advantages will appear from the following description and from the appended drawings, of which.

MORE DETAILED DESCRIPTION

In the method of the invention used to obtain composite materials based on polymer and liquid crystals, a reticulable mixture (A) of monomer, containing a few per cents of a photo-initiator and a mixture (B) of liquid crystals are used to make a homogeneous mixture $(M)_o$ in any proportion so as to subsequently define a polymer of variable porosity.

Figure 1:
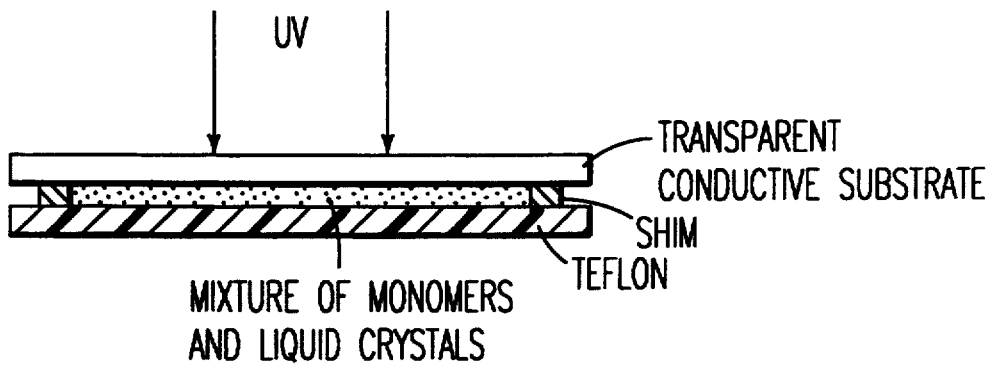
FIG. 1 shows a dismountable cell containing a mixture of monomer plus liquid crystal, subjected to an ultraviolet irradiation.

It is advantageously possible to introduce this mixture (M) by capillarity into a cell that is formed beforehand by a transparent, conductive substrate (S) (possibly a strip of transparent material covered with a fine conductive layer of indium-tin oxide) a substrate $(S)_o$ with low surface energy (possibly Teflon) that can easily be separated from a polymer film and shims that are known whose use is controlled, the unit formed by the substrates (S) and $(S)_o$ being held by clamps. The cell thus made and filled may be irradiated by ultraviolet irradiation as shown in FIG. 1. There is then obtained a reticulate polymer network containing inclusions of liquid crystal (XL)o, the volume of these inclusions being governed by the mixture (B) content in the mixture $(M)_o$.

The cell may then be opened, the substrate $(S)_o$ displaying little adhesion to the previously formed film. Said film may then be washed with a solvent $(L)_o$ capable of expanding the polymer network and enabling the extraction of the traces of monomers and of initiator as well as the extraction of the liquid crystal (XL).

A second mixture (M) comprising a solvent (L) that is also capable of expanding the polymer and that can furthermore be the solvent $(L)_o$ and a mixture of liquid crystal (XL) and of dye (C) (the percentage of dye (C) being very low as compared with that of the liquid crystal) is put into contact with the porous film of reticulate polymer so as to obtain the diffusion of the liquid crystal (XL) and of the dye (C) within the formed network.

Typically, the solvents $(L)_o$ and (L) may be dichloromethane or hexane.

The solvent (L) is then allowed to evaporate, and then the porous film of reticulate polymer is vacuum-dried in order to eliminate the last traces of solvent.

To obtain the composite material capable of passing from a light-scattering state to a transparent state under electrical control, a second conductive and transparent substrate (S)' is deposited on a polymer film containing inclusions of liquid crystal plus dye.

The screen thus made has a contrast that is far higher than that of an identical screen containing no dye. The optimization of the polymer content and dye content and of the thickness of the film makes it possible to obtain both high contrast and low control voltage.

Exemplary embodiment of a screen made with the method of the invention, for obtaining a composite material based on polymer and liquid crystal.

A mixture is made containing 17.3% of monomer marketed by Merck BDH and referenced PN 350 (containing 2.5% of photo-initiator Darocure 1173) and 82.7% of liquid crystal marketed by Merck and referenced TL 202. The mixture is introduced by capillarity into a cell as described here above, with a thickness of 23 μm. Irradiation is carried out at a wavelength in the region of 365 nm. The cell is opened, and the network formed is washed in dichloromethane. The cell is washed and then expanded by means of a mixture of:

20% of liquid crystal TL containing 1% of a black mixture of dichroic dyes marketed by Merck BDH and referenced F 593. 80% of dichloromethane.

The dichloromethane is evaporated for several hours. Indeed, it is preferred that the kinetics of evaporation are sufficiently slow to introduce the maximum quantity of entities of liquid crystal and dyes into the pores of the network formed. The film is then vacuum-dried for one hour. A second conductive substrate is then obtained.

Figure 2:
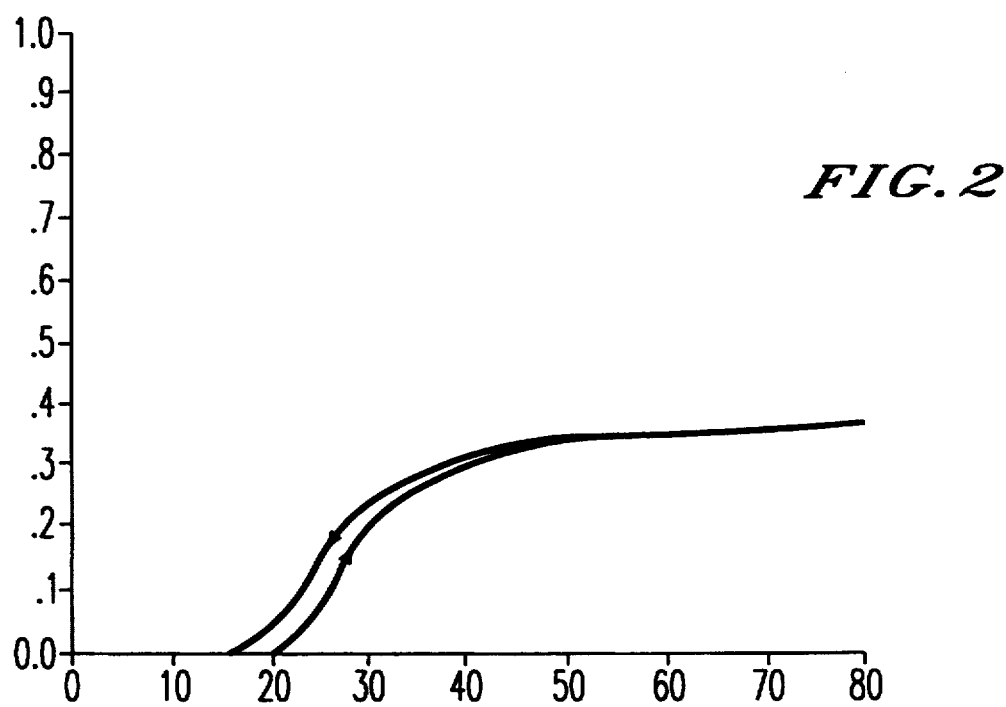
FIG. 2 shows the evolution of the transmission of a screen made according to the method of the invention, as a function of the voltage applied to the screen.

The screen thus obtained is characterized by measuring the transmission as a function of the control voltage. The ratio of the transmissions Tmax/Tmin=1450, Tmax corresponding to the maximum transmission that can be expected under voltage and Tmin corresponding to transmission in the light-scattering state at rest without voltage applied to the screen. FIG. 2 shows the evolution of the transmission of the screen as a function of the voltage applied to the screen made according to the invention. It can thus be seen that the voltage needed to obtained 90% of transmission is of the order of 47 V.

What is claimed is:

1. A method to obtain composite material for a display screen, comprising a polymer (P), molecules of liquid crystal (XL) and molecules of dichroic dyes (C) wherein said method comprises the following steps:

the making of a porous film (F) of reticulate polymer on a substrate (S);

the diffusion, in the porous film (F), of a mixture (M) containing a solvent (L) capable of expanding the polymer, molecules of liquid crystal (XL) and molecules of dichroic dye;

the evaporation of the solvent, leading to the obtaining of a polymer film with inclusions comprising a mixture of liquid crystal and dichroic dye.

2. A method for obtaining composite material for a display screen according to claim 1, wherein the porous film of reticulate polymer is obtained from a mixture $(M)_o$ of photopolymerizable monomer, photoinitiator and liquid crystal $(XL)_o$.

3. A method for obtaining composite material for a display screen according to claim 2, wherein the monomer is polyfunctional to form a network of reticulate polymer during the polymerization.

4. A method for obtaining composite material for a display screen according to either of the claims 2 or 3, wherein the mixture $(M)_o$ is introduced by capillarity into a dismountable cell having a substrate (S) and a second substrate $(S)_o$ with low surface energy, separated from the substrate (S) by shims.

5. A method for obtaining composite material for a display screen according to claim 4, wherein the photopolymerization is achieved by ultraviolet irradiation through the substrate $(S)_o$.

6. A method for obtaining composite material for a display screen according to claim 5 wherein, after the polymerization, the substrate $(S)_o$ is removed and the porous film of reticulate polymer containing inclusions of liquid crystal $(XL)_o$ is washed with a solvent $(L)_o$ so as to eliminate the traces of monomer and initiator as well as the liquid crystal $(XL)_o$.

7. A method for obtaining composite material for a screen according to claim 6, wherein the mixture (M) is introduced into the porous film of polymer.

8. A method for obtaining composite material for a display screen according to claim 6, wherein the solvent $(L)_o$ is identical to the solvent (L).

9. A method for obtaining composite material according to claim 8, wherein the photopolymerizable monomer is of the acrylic type.

10. A method for obtaining composite material for a display screen according to claim 9 wherein the solvent (L) is dichloromethane.

11. A method for obtaining composite material according to claim 9, wherein the solvent (L) is hexane.

12. A method for obtaining composite material for a display screen according to claim 2, wherein the liquid crystal $(XL)_o$ used to create the porosity of the film is the same as the liquid crystal (XL) of the final composite material.

13. A method for obtaining composite material according to claim 12, wherein the photopolymerizable monomer is of the acrylic type.

14. A method for obtaining composite material for a display screen according to claim 1, wherein the porous film (F) of reticulate polymer is obtained from a mixture $(M)'_o$ of monomer, a liquid that is a solvent of monomer and not a solvent of polymer formed out of the polymer, said liquid having a low surface tension at ambient temperature.

15. A method for obtaining composite material for a display screen according to claim 1, wherein the step for the evaporation of the solvent (L) is followed by a second step of vacuum-drying to eliminate the remaining traces of solvent.

* * * * *